US008065236B2

(12) United States Patent
Thompson et al.

(10) Patent No.: US 8,065,236 B2
(45) Date of Patent: Nov. 22, 2011

(54) COIN CURRENCY CONVERSION SYSTEMS AND METHODS

(75) Inventors: Mark Thompson, Denver, CO (US); Kenneth Algiene, Littleton, CO (US); Paul A. Blair, Parker, CO (US)

(73) Assignee: The Western Union Company, Englewood, CO (US)

( * ) Notice: Subject to any disclaimer, the term of this patent is extended or adjusted under 35 U.S.C. 154(b) by 1412 days.

(21) Appl. No.: 10/120,073

(22) Filed: Apr. 9, 2002

(65) Prior Publication Data

US 2003/0191722 A1  Oct. 9, 2003

(51) Int. Cl.
*G06Q 20/00* (2006.01)

(52) U.S. Cl. ............... 705/69; 705/64; 705/65; 705/68

(58) Field of Classification Search ............ 705/66, 705/67, 14, 61; 194/217, 347; 453/1–63
See application file for complete search history.

(56) References Cited

U.S. PATENT DOCUMENTS

| 5,559,887 | A  | * | 9/1996 | Davis et al. | 705/68 |
|---|---|---|---|---|---|
| 5,857,020 | A  | * | 1/1999 | Peterson, Jr. | 705/52 |
| 5,987,439 | A  | * | 11/1999 | Gustin et al. | 705/43 |
| 6,308,887 | B1 | * | 10/2001 | Korman et al. | 235/379 |
| 6,318,536 | B1 | * | 11/2001 | Korman et al. | 194/217 |
| 6,467,685 | B1 | * | 10/2002 | Teicher | 235/379 |
| 6,644,696 | B2 | * | 11/2003 | Brown et al. | 283/67 |
| 6,854,581 | B2 |   | 2/2005 | Molbak |  |
| 6,863,168 | B1 | * | 3/2005 | Gerrity et al. | 194/347 |
| 6,997,803 | B2 | * | 2/2006 | LeMay et al. | 463/20 |
| 7,028,827 | B1 | * | 4/2006 | Molbak et al. | 194/346 |
| 2004/0124062 | A1 | * | 7/2004 | Molbak | 194/217 |
| 2004/0153406 | A1 | * | 8/2004 | Alarcon-Luther et al. | 705/41 |
| 2005/0086140 | A1 | * | 4/2005 | Ireland et al. | 705/35 |
| 2006/0064379 | A1 | * | 3/2006 | Doran et al. | 705/42 |

OTHER PUBLICATIONS

Web page, "What is Coinstar all About?", at URL=http://www.coinstar.com/coinstar2/cswebframe.nsf/GoHome, printed Jun. 13, 2002.

* cited by examiner

*Primary Examiner* — Jamie Kucab
(74) *Attorney, Agent, or Firm* — Kilpatrick Townsend & Stockton LLP

(57) ABSTRACT

A method for converting coined money to another type of value proceeds by receiving a plurality of coins into a coin processing machine. The coins are processed with the coin processing machine to determine a value of the coins. An electronic record of the determined value is produced using the coin processing machine. Further, the record of the determined value is electronically transmitted from the coin processing machine to a remote storage location.

8 Claims, 5 Drawing Sheets

COIN CURRENCY CONVERSION SYSTEMS AND METHODS

BACKGROUND OF THE INVENTION

This invention relates generally to the field of currency conversion. More specifically, the invention relates to the conversion of coinage to other types of currency.

Most currencies include both coins and paper money. For example, the currency of the United States includes pennies, nickels, dimes, quarters, half dollars and dollar coins in addition to paper money. Due to inflation over time, the value of such coinage has become relatively small. Hence, for many it is inconvenient to carry coins. As such, many simply let their coins accumulate, often scattered about the home or office. When a large number of coins have accumulated, it is inconvenient and time consuming to organize the coins and take them to a bank for conversion to paper money.

Because of these inconveniences, some have proposed coin machines that process coins and determine their value. For example, one such coin machine is commercially available from Coinstar. After processing the coins, such machines may issue a receipt that is redeemable at the store where the machine is located, either for cash or in store credit. Hence, such receipts are typically only good within the store where the machine is located.

This invention is related to other ways to convert coins to various types of value. The invention thus provides various alternatives for receiving payments from coins.

BRIEF SUMMARY OF THE INVENTION

The invention provides various systems and method for converting coined money to other types of value. In one embodiment, the method utilizes a coin processing machine that processes multiple coins to determine their value. An electronic record of the determined value is also created. This record is electronically transmitted from the coin processing machine to a remote storage location. In this way, a remotely stored record of the value may be used to pay out the money in a variety of ways.

For example, a printer associated with the coin processing machine may print a receipt having a payment identifier that is part of the electronic record. The customer may then take the receipt and input the payment identifier into a cash dispensing machine, such as an ATM, that has access to the electronic record. After verifying the payment identifier, the cash dispensing machine may dispense some or all of the determine value in cash. The electronic record may also be debited accordingly.

As another example, the payment identifier may be stored on a card using a writer that is in communication with the coin processing machine. Optionally, such a card may be dispensed from the coin processing machine. This card may then be read with a card reader that is in communication with the remote storage location. For instance, the card reader may be incorporated into a cash dispensing machine so that cash may be dispensed, and the electronic record debited. In some cases, the card may also include a smart chip or other storage device so that the electronic record may be stored directly on the card.

As a further example, the coin processing machine may have an entry device to permit the customer to enter account information into the coin processing machine along with a request to credit the value to the account. The entry device may comprise, for example, a key pad, a traditional keyboard, a MICR reader, an OCR reader, a smart card reader, or the like. Such accounts may include, for example, checking accounts, savings accounts, investment accounts, credit card accounts, educational accounts, and the like. This information may be included with the electronic record that is transmitted so that such an account may be credited.

As still another example, the value of the coins may be transferred in the form of a money transfer. This may be accomplished by entering into the coin processing machine information on a payee and transmitting this information to the remote storage location. When the payee requests the money, this record is accessed and the value is debited for the amount of the pay out.

In an alternative method, following processing of the coins to determine their value, a negotiable instrument may be issued for at least some of the value of the coins. For instance, the coin processing machine may have an associated printer to print a money order. As another option, the coin dispensing machine may be configured to make payments in paper money, i.e. cash.

The invention also provides an exemplary system for converting money to another type of value. The system includes a coin processing machine that is configured to receive a plurality of coins and to process the coins to determine their value. In one embodiment, the coin processing machine may include a communications interface so that an electronic record of the value may be transmitted from the coin processing machine to a remote storage location. In another embodiment, a negotiable instrument dispenser may be associated with the coin processing machine to dispense negotiable instruments, such as a money order or cash, as payment for the coins.

In one aspect, the coin processing machine may have an associated printer for printing a receipt containing a payment identifier. This identifier may be used at a cash dispensing machine to receive a cash pay out. In another aspect, the coin processing machine may include a writer to store the payment identifier on a card. The identifier may be read in a reader so that a cash pay out may be provided at a cash dispensing machine. Conveniently, the coin processing machine may also include a card dispenser so that a card may be dispensed to the customer.

In a further, aspect the coin processing machine may include an entry device so that information on how the value is to be paid out may be entered. For example, the customer may enter an account that is to be credited. As another example, the customer may enter information on a payee so that the value may be transferred as a money transfer. Conveniently, the coin processing machine may include an associated display screen to permit the customer to select from various pay out options.

DETAILED DESCRIPTION OF THE INVENTION

The invention provides systems and methods for converting coins to other types of value. The invention may conveniently utilize a coin processing machine to process the coins and determine their value. Once the value is determined, the pay out may be at the coin processing machine itself, at equipment that is coupled to machine, or at one or more remote locations. Further, payments may be made using a wide variety of value types and using a wide variety of techniques. For example, payments may be made in cash, by check, by money order, using credits, using stored values (that are stored on a card or in an electronic account) and the like. Further, the value may be converted to other types of currencies. For example, if the processed coins were in U.S. currency, their value may be converted to Mexican pesos, or some other country's currency. Payment techniques used by the invention include: dispensing of a negotiable instrument, such as in cash, by check, by money order, by scrip, and the like, performing a money transfer transaction, performing a bill payment transaction, performing a prepayment for services transaction (such as prepaying for phone time) and crediting of a bank account, credit account, investment account, stored value account or card, educational account, or the like. In one aspect, the coin processing machine may be configured to electronically transmit information on the determined value along with any other transaction information to a transaction system for further processing. For example, such information may be transmitted to the systems described in copending US Publication No. 2005-014878 A1, filed Jan. 4, 2002, the complete disclosure of which is herein incorporated by reference. Once transferred to such a system, the value may be converted and/or paid out using any of the techniques described therein.

Figure 1:
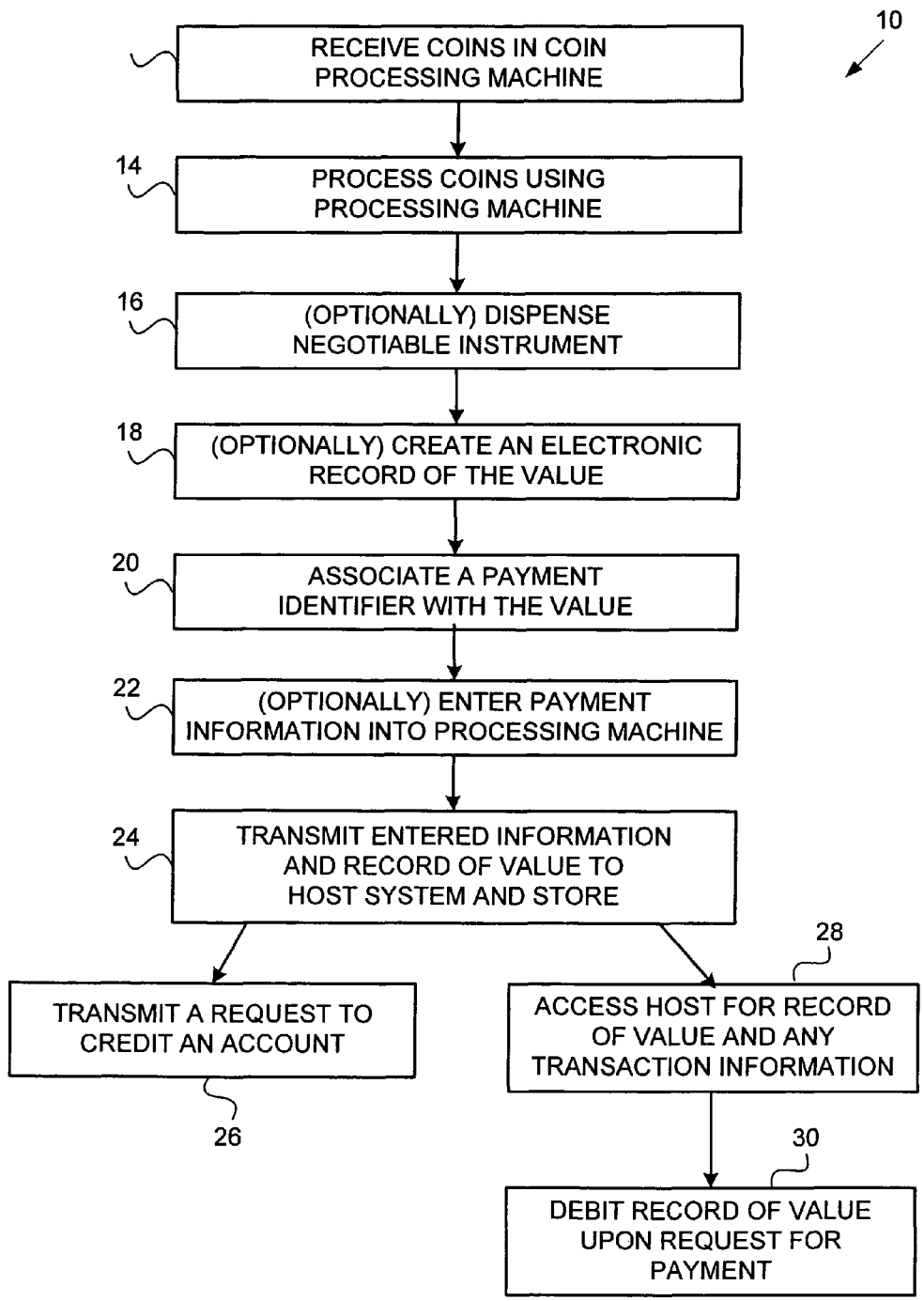
FIG. 1 is a flow chart illustrating one method for converting coin currency to another type of currency according to the invention.

Referring now to FIG. 1, one method 10 for converting coins to other types of currency will be described. As shown in step 12, the coins are input into a coin processing machine and are processed (step 14) to determine their value. Such techniques for processing coins and determining their value are known within the art. Once a value has been determined, the customer has the option of having a negotiable instrument dispensed for some or all (a portion) of the value as shown in step 16. The negotiable instrument may be dispensed directly from the coin processing machine or from other equipment coupled to the machine. For example, a printer may be employed to print a money order. As another option, a check may be printed having a MICR line. Such a check may be printed using a laser printer capable of printing MICR lines. Such printers may be integrated into the coin processing machine or coupled to the coin processing machine through a direct connection or a network. In one option, the user may type in the name of a payee into the coin processing machine or a computer associated with the machine, such as by using a traditional keyboard, so that the check may be printed in the name of the payee. As another option, paper money may be dispensed directly from the coin processing machine or from a cash dispenser coupled to the machine.

If the customer wishes to receive payment at a remote location away from the coin processing machine, the coin processing machine may be configured to produce an electronic record of the determined value as shown in step 18. As shown in step 20, a payment identifier may also be associated with the determined value. The payment identifier may be used to identify the record of the determined value when making a subsequent transaction as described hereinafter. The payment identifier may be assigned by the coin processing machine, by the customer, or the like. For instance, the customer may have a card with an existing identifier. This may be read by a reader and associated with the determined value. In some cases, the coin processing machine may dispense a card that may be used to store an assigned payment identifier simply by swiping the card through a writer. Or, if the card includes a memory, such as a smart chip, the electronic record may be stored directly on the card and may be debited upon presentment of the card. As another example, the coin processing machine may print a receipt or other document having the determined value and the associated payment identifier.

In some cases, the customer may wish to transfer the value of the coins to a payee using a money transfer transaction. In such a case, the customer may enter payment information into the coin processing machine as shown in step 22. Such payment information may include, for example, the name of the customer, the name of the payee, contact information for the customer and/or payee, and the like. Optionally, the value may be transferred to a payee in the form of a check using a check MICR printer as previously described.

As shown in step 24, any information needed for a subsequent transaction (including the determined value of the coins) is electronically transmitted from the coin processing machine to a host computer system and stored. The transmission may be performed using any technology known in the art, including via the Internet, a wide area network, a local area network, a wireless network, a dedicated line, and the like. Once stored at the host system, the value of the coins may be paid out, transferred, debited, or used in some other manner as requested by the customer. For example, as shown in step 26, the customer may wish to credit the value to some type of account. To do so, the customer may provide account information to the coin processing machine that is transmitted to the host system along with the record of the value of the coins. This may be accomplished by typing or keying the information into the coin processing machine, or by using a reader. For example, a card having a stored account number may be processed by a reader to extract the account number. As another example, the coin processing machine may include a MICR reader to read a MICR line from a check or other document that contains the account number. As a further example, account information may be stored in the form of a bar code label that may be read by a bar code reader. For instance, many grocery stores include bar code readers that may be coupled to a coin processing machine to input the account information. Once the account information is entered, the host system may process the request to have the appropriate account credited. Such accounts may include, for example, credit card accounts, bank accounts, investment accounts, educational accounts, pre-pay type accounts, bill payment accounts and the like. As these accounts are credited, a corresponding debit may be applied to an account of the coin processing organization.

In other types of transactions, the record may remain at the host system until requested as shown in step 28. For example, if a money transfer request has been made, the record remains at the host until the payee requests payment. The record is then accessed to verify the payee and to debit the record upon payment to the payee as shown in step 30. As another example, the record may be accessed by an ATM system when the customer requests a pay out at an ATM. This may occur by inserting a card having the payment identifier into an ATM machine and requesting payment of the value. Alternatively, the payment identifier may be manually entered at the ATM. As a further example, the record may comprise a stored value that may be debited upon a request from any system authorized to use the stored value. For example, the customer may have a card with payment identifier that is presented to a retailer when making a payment. The stored value record may be accessed by the retailer's system using the identifier and an appropriate debit to the record made. Alternatively, the host system could transmit the stored value record to the ATM system or the retailer's system so that this information may be stored by a specific system to be used by the customer.

Figure 2:
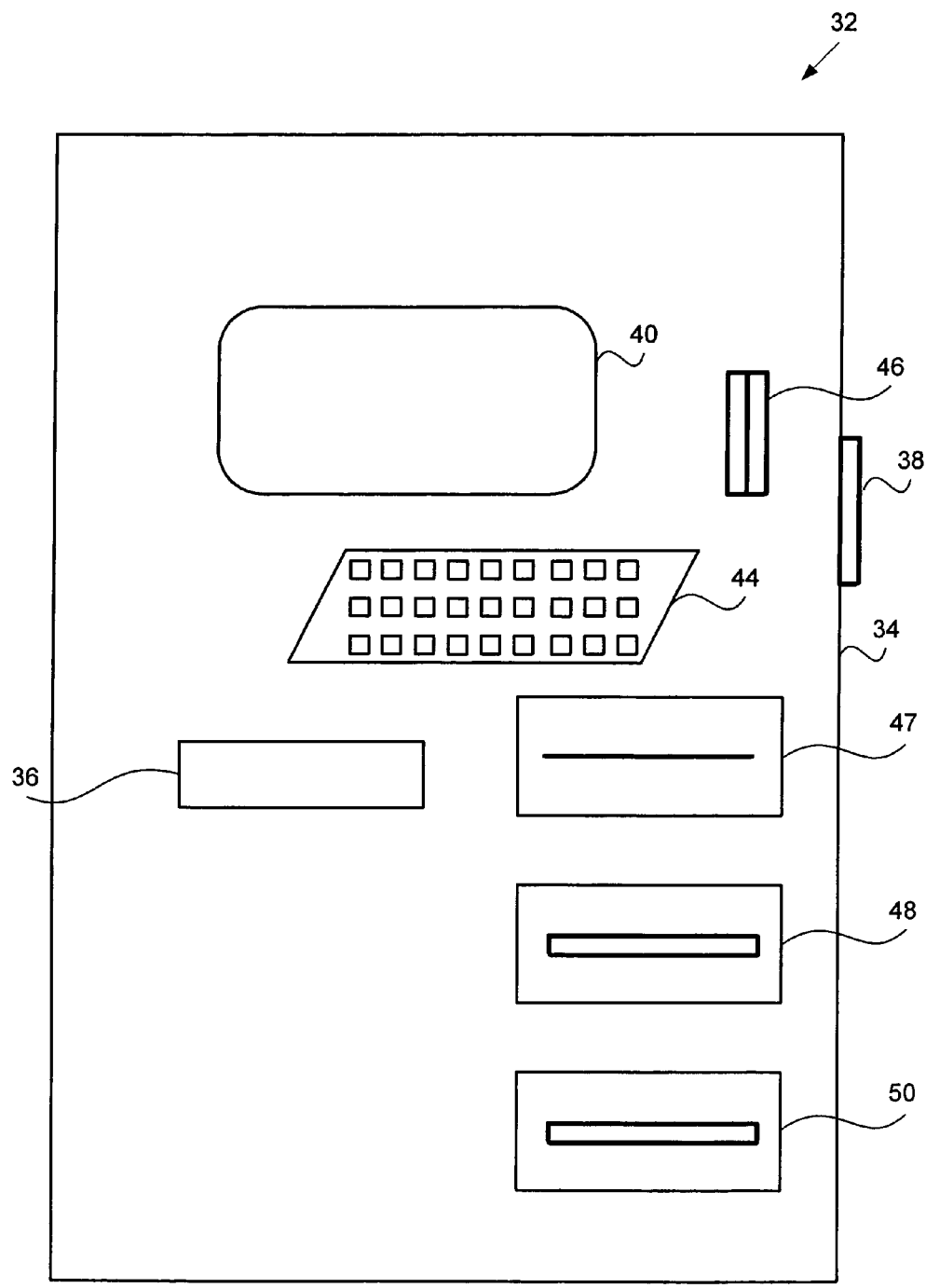
FIG. 2 is a front schematic view of one embodiment of a coin processing system according to the invention.

FIG. 2 illustrates one embodiment of a coin processing machine 32 that may be used to convert coins to another type of value. Machine 32 is constructed of a housing 34 that houses the various components of machine 32. Housing 34 also includes an opening 36 for depositing coins that are to be processed and valued. The coins may simply be deposited into opening 36 with no pre-sorting of the coins required. Machine 32 includes various components that process the coins and determines their value as is known in the art. For example, machine 32 may include components similar to those used in Coinstar processing machines.

Figure 3:
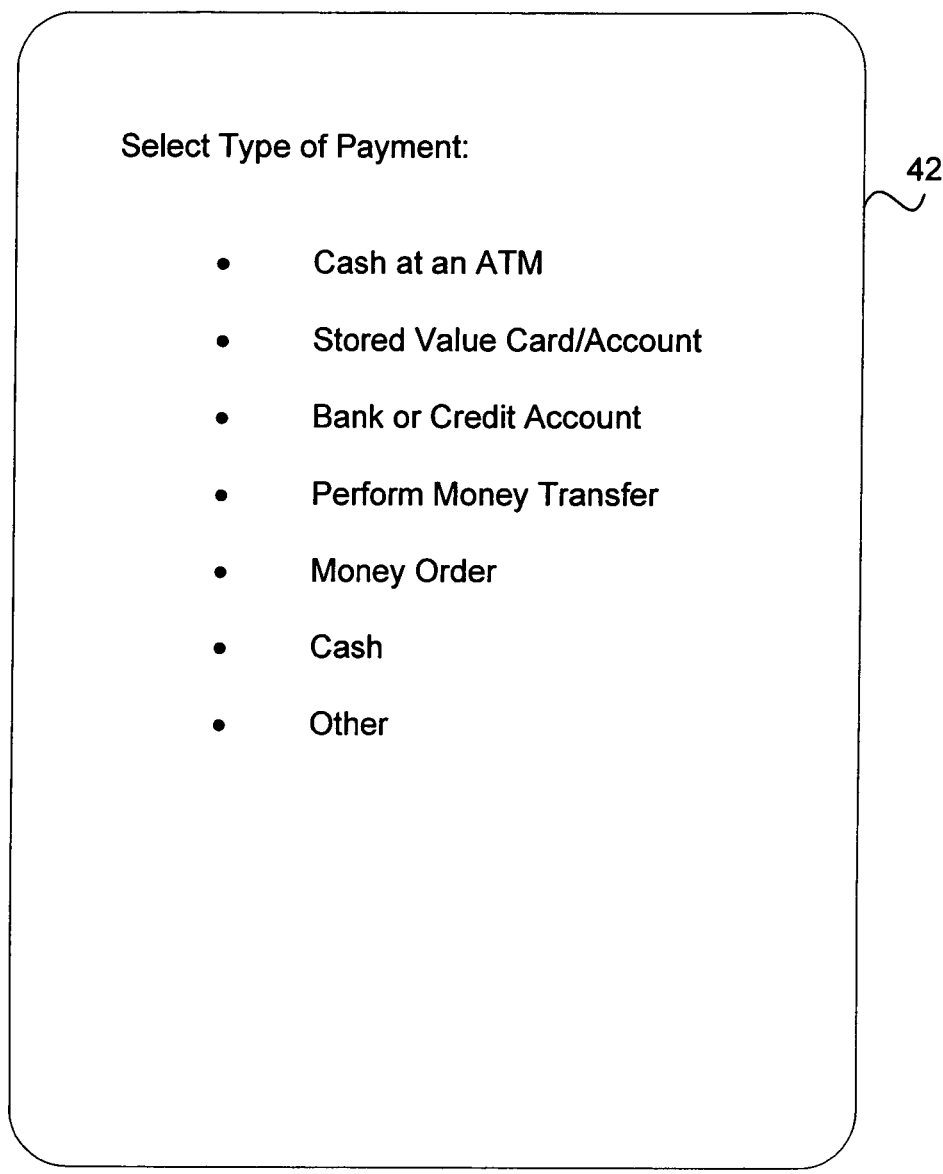
FIG. 3 illustrates a screen display that may be displayed on a display screen of the processing system of FIG. 2.

Machine 32 may also include one or more computer processors and electrical circuitry for creating an electronic record of the determined value. Machine 32 further includes an interface 38 that permits the electronic record to be transmitted to a host computer system using techniques known in the art. The transmission of the record may depend on the type of payment transaction selected by the customer. Conveniently, machine 32 may include a display screen 40 for displaying various payment options. For example, FIG. 3 illustrates one type of screen display 42 that may be displayed on screen 40. As shown, the customer may select from among the following options: cash payment at an ATM, payment using a stored value card, the crediting of a bank or credit account, by a money transfer, by a money order, and by a cash pay out. However, it will be appreciated that other options may also be presented to the customer. Machine 32 may also include an entry device 44, such as a keyboard, for selecting information on screen 40 as well as for entering other types of information. For example, upon selection of a payment option from screen display 42, other screens may be generated to elicit any necessary information. For instance, for a money transfer request, a form may be displayed to gather information on the payee.

Another way to enter information into machine 32 is by use of a card reader 46. Card reader 46 may be configured to read a mag stripe of a card that is swiped through reader 46. However, other readers may also be used, such as a smart card reader or MICR reader. Further, reader 46 may also be configured to write information to a card as well. As one example of how information may be input using reader 46, the customer may wish to have the determined value credited to a stored value account, credit card account, bank account, or the like. Once this option is selected, a card having the account information may be swiped through reader 46 to read the account information from the card. Machine 32 then associates the account information with the record of value. In some cases, reader 46 may be used to transfer the value directly to the card. The card may then be used to make purchases by directly debiting the card.

In some cases, a payment identifier may need to be associated with the record of value. For some transactions, this may simply be an account number provided by the customer. For other cases, such as when requesting a cash payment at an ATM or other kiosk, an identifier may be provided by machine 32. For example, machine 32 may include a printer 47 that prints a receipt having a payment identifier. This may be presented when making a transaction, such as a cash payment, to identify the record of value so that payment may be made.

Optionally, machine 32 may include a card dispenser 48 for dispensing cards. In this way, once a payment identifier is associated with the determined value, a card may be dispensed and swiped through reader 46 to store the payment identifier on the card.

Printer 47 may serve other functions as well. For example, the customer may request payment in the form of a money order. Printer 47 may then print and dispense such a money order. A suitable printer for printing such money orders is a FDX-400 printer, from Integrated Payment Systems, Inc.

As a further option, the customer may request a payment in paper money. A cash dispenser 50 may be used to pay out in paper money. In some cases, the paid out amount may be rounded down to the next dollar so that coins do not need to be dispensed. Further, any remaining values (e.g., portions of the value) may be paid out using any of the other techniques described herein. Also, a customer may select partial payments using different techniques; e.g., half in a money order, and half to be transferred to a payee.

Figure 4:
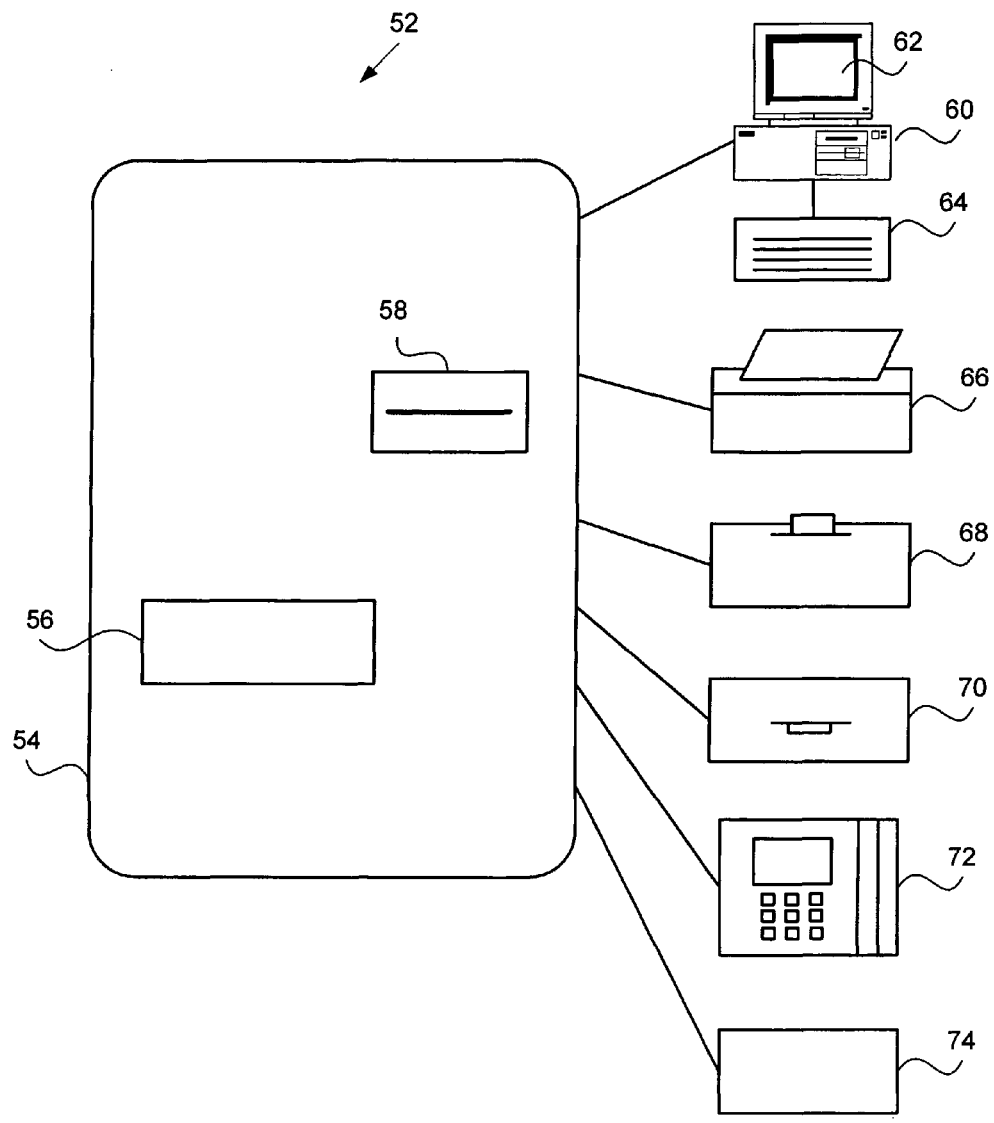
FIG. 4 is a front schematic view of another embodiment of a coin processing system according to the invention.

FIG. 4 illustrates a coin processing system 52 where some of the components are separate from a coin processing machine 54. Machine 54 includes an opening 56 for receiving coins for processing in a manner similar to that described in connection with FIG. 2. A printer 58 may also be included for printing a receipt of the calculated value of the coins. A variety of other components may be coupled to machine 54, but do not need to be integrally formed with machine 54. In this way, an existing coin processing machine 54 may be retrofit to provide the ability to pay out funds using other techniques and payment types. For example, a computer 60 having a display screen 62 and a keyboard 64 may be coupled to machine 54 to provide data entry and display capabilities, as well as for running various types of application software.

A printer 66, such as an FDX-400 printer, may be coupled to machine 54 to print negotiable instruments, such as money orders. A card dispenser 68 may be coupled to machine 54 for dispensing cards that are to receive a payment identifier. Further, a cash dispenser 70 may be used to dispense payments in paper money. Also, a transaction terminal 72 may be used to read information from cards as well as write information onto cards. Terminal 72 may also be used to credit accounts, such as a credit card account or a bank account after swiping a card or typing in account information. One type of terminal that may be used is a Hypercom T7 terminal, available from Hypercom Corporation. Other point of sale terminals may also be used so as those described in U.S. Patent Application No. 60/147,899, filed Aug. 9, 1999 (now abandoned) and U.S. Pat. No. 6,549,132, filed Aug. 9, 2000, the complete disclosure of which is herein incorporated by reference. Such a terminal may communicate over a phone line to credit the requested account. Further, an interface 74 may be used to permit machine 52 to communicate with one or more external systems.

Figure 5:
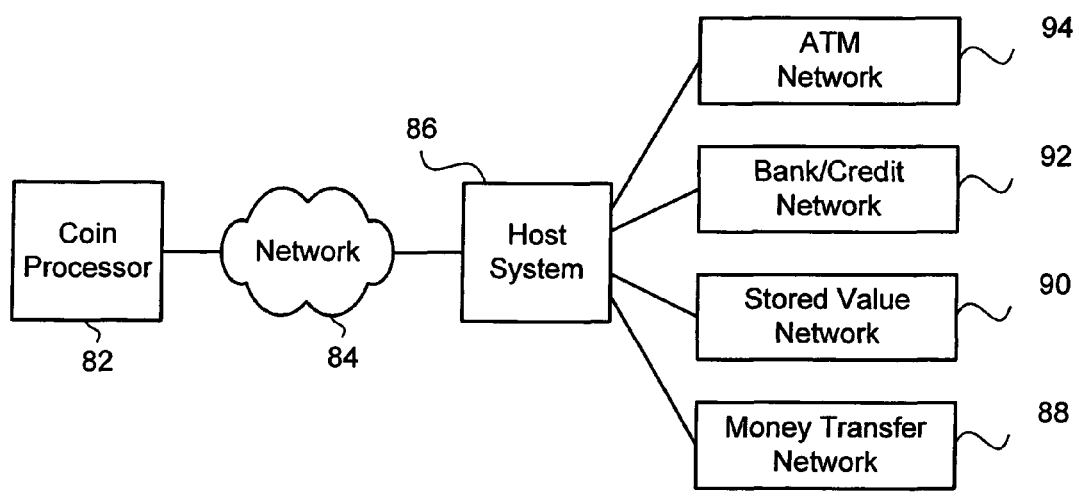
FIG. 5 is a schematic view of a currency conversion system according to the invention.

Shown in FIG. 5 is a system 80 for performing various financial transactions originating from a coin processing machine 82 that may be configured similar to any of those described herein. Machine 82 may communicate with external systems over a network 84, such as a phone network, the Internet, an intranet, or the like. One system that may communicate with machine 82 is a host computer system 86. Host system 86 may include one or more processors, databases and/or communication interfaces for coupling with other systems. The information transmitted from machine 82 may be stored by host 86 until needed for further processing.

One example of a system that may communicate with host 86 is a money transfer network 88. In this way, when a payee wishes to receive transferred money from the value of the coins, the payee may make a request at money transfer system 88. In turn, system 88 contacts host 86 to verify that a payment is to be made. The record of value may then be debited by the payment amount.

Another system that may communicate with host 86 is a stored value network 90. Stored value network may be one or more organizations that permit the use of stored values for store purchases. For example, such stores may issue gift or stored value cards that may be presented when making purchases. Such cards may include a payment identifier that is transmitted to host 86 so that the appropriate stored value may be debited. a3

A bank/credit network 92 may also communicate with host 86 to permit a bank account or credit card account to be credited with the value of the coins. When host 86 receives a record with the value of the coins and the associated account number, host 86 transmits the credit to network 92. A corresponding debit may also be made to the owner of the coin processing machine. Other types of credits that may be issued include credits to prepay for services or goods, such as phone service, credits to pay for an outstanding bill, or the like. Such networks are described in, for example, US Publication No. 2002/0143709 A1, filed Mar. 31, 2001, US Publication No. 2002/0143706 A1, filed Dec. 7, 2001, and US Publication No. 2002/0169719, filed Mar. 29, 2002, the complete disclosures of which are herein incorporated by reference.

An ATM network 94 may also be coupled to host 86 so that cash payments may be made at an ATM. For instance, at an ATM, a customer may present a payment identifier that is transmitted to host 86 to verify the request. If verified, the ATM may dispense the cash and the record of the value may be debited.

The invention has now been described in detail for purposes of clarity and understanding. However, it will be appreciated that certain changes and modifications may be practiced within the scope of the appended claims.

What is claimed is:

1. A method for processing coined money using a stored value account, the method comprising:
   receiving from a user a plurality of coins into a coin processing machine;
   processing the coins with the coin processing machine to determine a value of the coins, wherein processing the coins with the coin processing machine to determine the value of the coins comprises converting the value of the coins from one country's currency to another country's currency;
   receiving a name of a payee, wherein the user and payee are different persons;
   transmitting a money transfer request, wherein:
      at least a first portion of the determined value is distributed to the payee; and
      the first portion of the determined value is greater than zero;
   creating an electronic record of a second portion of the determined value with the coin processing machine, wherein the second portion of the determined value is greater than zero;
   associating the electronic record of the second portion of the determined value with a stored value account, wherein the stored value account is associated with a payment identifier;
   electronically transmitting the electronic record of the second portion of the determined value associated with the stored value account from the coin processing machine to a stored value network; and
   adjusting the value of the stored value account based on the electronic record.

2. A method as in claim 1, further comprising reading stored value account information from a card including the payment identifier using a reader that is in communication with the coin processing machine and associating the stored value account with the electronic record prior to electronically transmitting the record to the stored value network.

3. A method as in claim 2, further comprising reading the stored value account information from the card with a reading device that is in communication with the remote storage location stored value network.

4. A method as in claim 3, wherein the stored value network comprises a storage medium on a card.

5. A method as in claim 1, further comprising entering into the coin processing machine stored value account information and associating the account information with the electronic record.

6. A method as in claim 1, wherein the cash dispensing machine comprises an Automated Teller Machine.

7. A system for processing coined money using a stored value account, the system comprising:
   a coin processing machine that is configured to receive a plurality of coins and process the coins to determine a value of the coins, wherein processing the coins with the coin processing machine to determine the value of the coins comprises converting the value of the coins from one country's currency to another country's currency;
   a user input device, wherein the user input device is configured to receive a name of a payee, wherein the user and payee are different persons;
   a communications interface coupled to the coin processing machine, wherein the communications interface is in communication with a stored value network; wherein
   the coin processing machine is further configured to create an electronic record of the determined value of the plurality of coins,
   to associate a first portion of the determined value with a stored value account, wherein the first portion of the determined value is greater than zero,
   to transmit the electronic record to a stored value network so as to adjust the value of the stored value account based on the electronic record, and
   to transmit a money transfer request, wherein at least a second portion of the determined value is distributed to the payee and the second portion of the determined value is greater than zero;
   a printer in communication with the coin processing machine, wherein the printer is configured to print a receipt having a payment identifier for a user; and
   a cash dispensing machine configured to:
      receive the payment identifier from the user; and
      dispense at least some portion of the determined value from the cash dispensing machine;
   wherein the stored value network is configured to adjust the value of the stored value account based on an amount dispensed from the cash dispensing machine.

8. A system as in claim 7, further comprising a card reader in communication with the coin processing machine, wherein the card reader is configured to read stored value account information including the payment identifier from a stored value card and to transmit the to the coin processing machine for association with the determined value.

* * * * *

UNITED STATES PATENT AND TRADEMARK OFFICE
CERTIFICATE OF CORRECTION

PATENT NO. : 8,065,236 B2  
APPLICATION NO. : 10/120073  
DATED : November 22, 2011  
INVENTOR(S) : Thompson et al.

Page 1 of 1

It is certified that error appears in the above-identified patent and that said Letters Patent is hereby corrected as shown below:

In the Description:

Column 7, line 11, please delete "a3".

Signed and Sealed this  
Seventeenth Day of January, 2012

David J. Kappos  
*Director of the United States Patent and Trademark Office*